Figure 1:
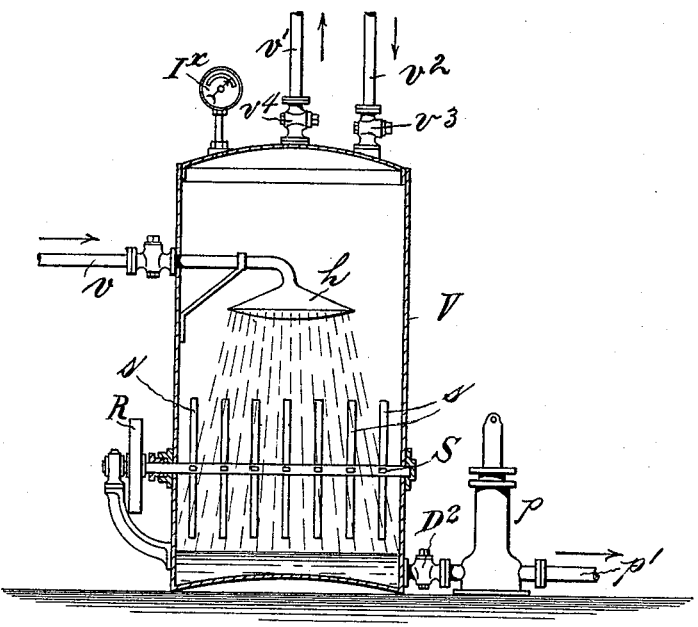

No. 642,604. Patented Feb. 6, 1900.
H. GRONWALD.
PRESERVATION OF BEER.
(Application filed Dec. 27, 1897.)
(No Model.) 2 Sheets—Sheet 1.

Witnesses:
B. A. Oher.
R. W. Sommers.

Inventor:
Hugo Gronwald.
by [signature]
Atty.

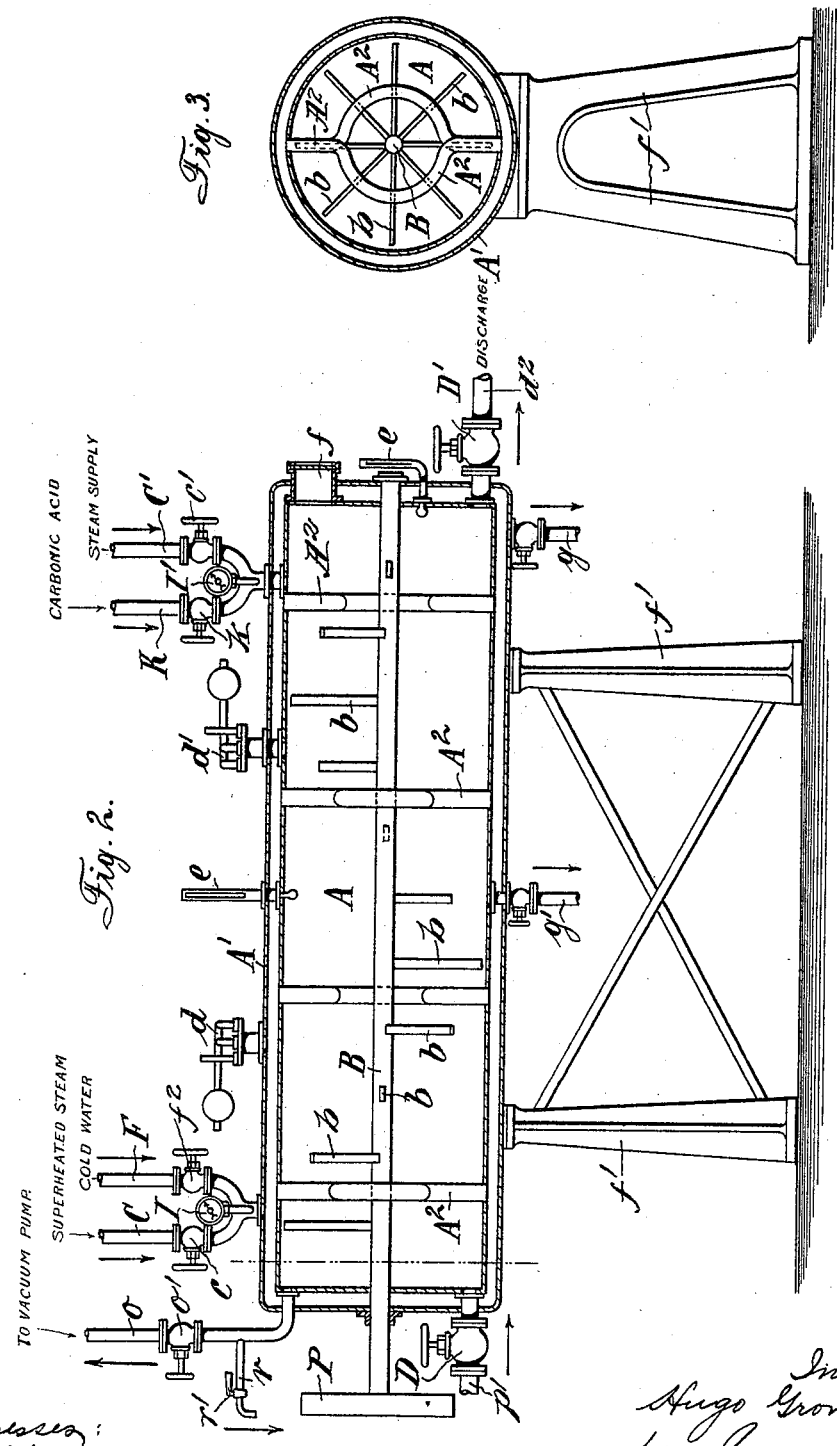

UNITED STATES PATENT OFFICE.

HUGO GRONWALD, OF BERLIN, GERMANY, ASSIGNOR TO THE BIER-SIPHON-ACTIEN-GESELLSCHAFT, OF CASSEL, GERMANY.

PRESERVATION OF BEER.

SPECIFICATION forming part of Letters Patent No. 642,604, dated February 6, 1900.

Application filed December 27, 1897. Serial No. 663,660. (No model.)

*To all whom it may concern:*

Be it known that I, HUGO GRONWALD, a subject of the German Emperor, and a resident of Berlin, Germany, have invented certain new and useful Improvements in and Relating to the Preservation of Beer; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has relation to the preservation of beer; and it has for its object a treatment which will relieve it of all disagreeable taste and smell peculiar to pasteurized beer.

When beer, especially young beer, or beer which has not been properly fermented—that is to say, when the fermentation has been a more or less impure one—or when insufficiently fermented, or when the fermentation is carried too far, is tested as to taste and smell, it will be found more or less impure. This is due to the formation during fermentation of volatile by-products which are held in solution and when the beer is pasteurized impart to it that peculiar disagreeable taste and smell referred to, which become the more pronounced when air or a constituent or constituents thereof is or are present, which is always the case before pasteurization. It has been proposed to deaerate beer by maintaining it under a partial vacuum for the purpose of ripening it and shortening the ruh stage before preparing it for market—that is to say, before the subsidiary fermentation to enliven the beer. This deaerating of the beer before the subsidiary fermentation does not relieve it of the volatile by-products formed during such subsidiary fermentation and which would become apparent if the beer after being made ready for market were heated to a pasteurizing temperature. I have discovered by practical experiments that this alteration in the taste and smell of beer, either before or after pasteurization, can be entirely avoided by the elimination of the volatile by-products referred to, and that this can be done more effectually by also eliminating the air in the beer before pasteurizing the same.

I have found by practical experiments that this object of my invention can be attained in various ways, as follows: The injurious volatile by-products, together with the air in the beer, may, for instance, be eliminated mechanically before pasteurization by exhausting said by-products and air by means of a vacuum, which operation is materially expedited and made more thorough by simultaneous agitation of the beer. If desired or if found necessary, and to cause the thorough purification of the beer, the described mode of purification may be supplemented by washing the beer with an indifferent gas, preferably carbonic-acid gas, introduced into the beer while the latter is being agitated, the vacuum being at the same time maintained, whereby any injurious by-products and air remaining in the beer are driven out by the gas and exhausted, the beer being more or less saturated with the gas, which finally takes the place of said by-products and air. On the other hand, the purification of the beer may be effected by the washing process alone, and when this is carried out in a vessel but partially filled with beer the injurious by-products and air driven out of the beer by the gas will collect in the vacant space and may be exhausted therefrom from time to time or continuously until the beer is thoroughly purified.

The purification of the beer by treatment with an indifferent gas can be materially expedited by heating the beer to from 20° to 30° centigrade, in which case I preferably cool the same down to or approximately to normal temperature before pasteurization.

When the purification of the beer is effected by exhausting the injurious by-products and air by means of a vacuum, heat should not be resorted to, as I have found that even under a moderate vacuum there is a loss in the precentage of alcoholic constituents as well as in the aroma, especially in the hop aroma.

My invention does, therefore, not consist in the deaeration of beer as a means of shortening the ruh stage nor in the mere pasteurization of beer as a means of preserving it, but in a method by which not only the air but the volatile by-products above referred to are also eliminated before the beer is pasteurized and in then pasteurizing the beer, substantially as hereinabove described and as particularly pointed out in the claims.

In breweries having a large output the purification and pasteurization can be effected in separate apparatuses so organized as to make these operations practically continuous in order to save time and labor; but when the output is comparatively small or where time and labor are no great factors both of said operations can be carried out in one and the same apparatus.

That my invention may be fully understood I will describe the same in detail, reference being had to the accompanying drawings, in which—

Figures 1 and 2 show vertical sectional elevations of a purifier and pasteurizer, the latter organized for use as a purifier and pasteurizer; and Fig. 3 is a vertical cross-section of Fig. 2.

Referring to Fig. 1, V indicates a vessel for the beer to be purified, and $v$ the feed-pipe, which extends into said vessel near its upper end and carries a rose-head $h$, so as to feed the beer in a finely-divided state, said pipe being provided with a suitable stop-cock. S indicates a revoluble stirrer or agitator-shaft provided with stirring or agitating arms or blades $s$, and $p$ is a suction and force pump connected with the vessel V near its lower end by a pipe provided with a suitable stop-cock $D^2$ for transferring the purified beer to a pasteurizer by connecting the latter to the force-pipe $p'$ of said pump. The vessel V is further provided with a pressure-gage $I^x$, with an exhaust-pipe $v'$ and a gas-pipe $v^2$, each provided with a stop-cock $v^4$ $v^3$, respectively, the pipe $v'$ being connected with a suitable vacuum apparatus, as a pump, (not shown,) and the pipe $v^2$ with a source of carbonic-acid gas under pressure. (Also not shown.)

The operation is as follows: When the beer is to be purified by exhausting therefrom the injurious by-products above referred to, together with the air held mechanically in the beer, the stop-cock $v^4$ of exhaust-pipe $v'$ is opened, all the others being closed and a more or less perfect vacuum established in vessel V. Then the stop-cock in feed-pipe $v$ is opened to admit beer and the agitator-shaft is rotated from any suitable prime motor belted to pulley R on said shaft, beer being fed to the vessel until the latter is nearly full, when the stop-cock in the feed-pipe is closed. The vacuum is maintained while the beer is being agitated until the purification is completed, when the purified beer can be forced into the pasteurizing apparatus. If, on the other hand, the described process of purification is to be supplemented by a further purification by washing the beer with an indifferent gas, as carbonic-acid gas, which I prefer to use, then after purifying the beer as described the stop-cock $v^4$ in exhaust-pipe $v'$ is closed and the stop-cock $v^3$ in gas-supply pipe $v^2$ is opened to admit carbonic-acid gas under pressure, whereby such injurious by-products and air still remaining in the beer are driven out, the impure gases collecting in the upper part of vessel V. During this operation the pressure in vessel V is to be so regulated as not to interfere with the liberation of the air and volatile constituents referred to, which can readily be done through the medium of the vacuum apparatus or by maintaining a partial vacuum in vessel V during the operation of washing, the beer being kept agitated and the operation continued for such a length of time as may be deemed proper, after which the beer is transferred to the pasteurizer through pump $p$.

It is obvious that with a purifier constructed as described the purification by washing with an indifferent gas only, as hereinabove set forth, may also be carried out and the operation expedited by preheating the beer to a temperature of from 20° to 30° centigrade.

The pasteurizer may be of any well-known construction and connected with the purifier through the above-mentioned force-pipe $p'$, provided with a suitable stop-cock D. I prefer, however, to construct the pasteurizer for use as such and as a purifier wherein the beer may be purified by any of the methods described, as shown in Figs. 2 and 3. Referring to these figures, $f'$ indicates a suitable framing which supports a vessel A, preferably of the form of a horizontal cylinder encompassed by a jacket A' and provided with an agitator-shaft B, extending axially through the vessel and revolving in fluid-tight bearings in the end walls or heads thereof and in the like walls of the jacket and carrying a suitable belt-pulley P. The jacket is provided with a valved outlet or exhaust pipe $g$ and the vessel with a valved purge-pipe $g'$. To one end of the vessel A is connected the feed-pipe $p'$ above referred to and to the other a discharge-pipe $d^2$, each provided with a suitable valve or stop-cock D D', respectively. The vessel A is also provided with one or more thermometers $e$ at different levels and with a sight-hole $f$ in the upper part of one of its heads and a safety-valve $d'$. Within the vessel at suitable distances apart are arranged coils $A^2$, which communicate with the jacket A', whereby the contents of the vessel can be more rapidly and uniformly heated or cooled, as the case may be. An exhaust-pipe $o$, provided with a stop-cock $o'$ and connected or adapted to be connected with a suitable vacuum apparatus, as a pump, (not shown,) communicates with the upper part of the vessel through the left-hand head thereof, and said pipe has a branch $r$, also provided with a stop-cock $r'$. The jacket A' is provided with a safety-valve $d$ and is in communication with a source of steam-supply, preferably superheated steam, through a pipe C, provided with a stop-cock $c$, and with a source of supply of a cooling agent—as, for instance, cold water—through a pipe F, provided with a stop-cock $f^2$, said pipes C F being connected to a suitable union provided with a pressure-gage I. The vessel A is also in communication, through a pipe C', provided with a stop-cock $c'$, with a source of steam-supply (which may be the source that supplies steam to pipe C) and through a pipe K, provided with a stop-cock $k$, with a source of supply of carbonic-acid gas under pressure, said pipes C' K being likewise connected to a suitable union provided with a pressure-gage I'.

Before the beer purified in vessel V is admitted to the pasteurizing vessel A the air is exhausted therefrom, all the stop-cocks except the one $o'$ in exhaust-pipe $o$ being closed. While the air is being exhausted, superheated-steam through pipe C is admitted to jacket A', the stop-cock in outlet-pipe $g$ being partly opened, and when the proper vacuum has been established the stop-cock $o'$ is closed and the stop-cock D is opened and the pump $p$, Fig. 1, set in motion to force the purified beer from the purifier to the pasteurizing vessel A, its agitator-shaft B being at the same time set in motion, and when the charge of beer in vessel V has been transferred to vessel A the stop-cock D is closed and the beer heated to a pasteurizing temperature for a sufficient time to pasteurize it. The stop-cock $c$ of steam-supply pipe C is now closed, while stop-cock $g$ is fully opened, as is also stop-cock $f^2$ in the pipe F, whereby a cooling agent, as cold water, is supplied to jacket A, the circulation of such cooling agent being continued until the beer has been cooled to the proper degree, and may then be forced directly into casks or barrels through the medium of a force-pump interposed in the discharge-pipe $d^2$ (not shown) or to a suitable filling apparatus, during which operation the rotation of the agitator-shaft is or may be stopped. If, however, it is desired to charge the beer with carbonic-acid gas while being pasteurized, the stop-cock $k$ in pipe K is opened and carbonic-acid gas admitted to vessel A, such gas being brought into intimate contact with the beer through the agitator.

It is obvious that instead of forcing the beer from the purifier to the pasteurizer and from the latter to the casks or barrels or a filling apparatus this may be effected by the pressure of the carbonic-acid gas, and it is furthermore obvious that where the usual precautions are taken in the filling of casks or barrels with pasteurized beer the latter does not come in contact with atmospheric air at any time during the described operations, and can, therefore, not become contaminated by injurious germs usually conveyed by air.

I have hereinbefore stated that under certain conditions of manufacture the apparatus shown in Figs. 2 and 3 may also be used for purifying the beer by any of the methods hereinbefore specified. If the purification is to be effected by simply exhausting the injurious by-products, together with such air as may be mechanically held by the beer, by means of a vacuum, the air in vessel A is first exhausted, the beer is then admitted to said vessel, and the agitator-shaft B caused to revolve, the vacuum being maintained to exhaust the aforesaid gases and air until the beer is purified, after which it is pasteurized or pasteurized and charged with carbonic-acid gas, as above set forth. If, on the other hand, the described method of purification is to be supplemented by the washing of the beer with carbonic-acid gas, the air in vessel A is first exhausted, then said vessel partly filled with beer, and the agitator-shaft caused to revolve, the partial vacuum being maintained for a suitable length of time, after which the stop-cock $o'$ in exhaust-pipe is closed and the stop-cock $k$ in carbonic-acid-gas-supply pipe opened to supply gas to vessel A under pressure, whereby the injurious by-products and air yet remaining in the beer are driven out and collect with the carbonic-acid gas in the vacant space in said vessel. In this operation it is of course also necessary to regulate the pressure in vessel A so as not to interfere with the liberation of the air and volatile constituents referred to, and this may be done through the branch pipe $r$ of exhaust-pipe $o$ by opening or partly opening the stop-cock $r'$ to relieve the pressure. This operation may be continued or repeated as often as may be necessary to effect the complete purification of the beer, which will then also be more or less charged with carbonic-acid gas, and may then be pasteurized and further charged with carbonic-acid gas, as above set forth. Finally, if the purification of the beer is to be effected by washing with carbonic-acid only this can readily be effected by first exhausting the air from vessel A, then closing the stop-cock $o'$ in exhaust-pipe $o$, and proceeding as described above relatively to the method of washing as supplemental to the method of exhausting, the operation of washing being continued or repeated as often as may be found necessary.

Inasmuch as the apparatus shown in Figs. 2 and 3 is provided with means for heating it, the beer can readily be heated to from 20° to 30° centigrade for the purpose of expediting the purification by washing, as hereinbefore set forth.

For cleansing vessel A steam is admitted thereto through pipe C', the stop-cock in purge-pipe $g'$ being opened.

Having thus described my invention, what I claim as new therein, and desire to secure by Letters Patent, is—

1. In the art of preserving beer, the improvement which consists in deaerating the beer and at the same time removing therefrom those by-products of fermentation which, when the beer is pasteurized, alter its taste and smell, then pasteurizing and subsequently cooling the beer, and effecting both operations in a closed vessel and in the presence of an indifferent gas, for the purpose set forth.

2. In the art of preserving beer, the improvement which consists in deaerating and at the same time removing from the beer, heated to a temperature not exceeding 30° centigrade and while being agitated, those volatile by-products of fermentation which, when the beer is pasteurized, alter its taste and smell, then pasteurizing and subsequently cooling the beer, and effecting both operations in a closed vessel and in the presence of an indifferent gas, as carbonic-acid gas, for the purpose set forth.

3. In the art of preserving beer, the improvement which consists in mechanically deaerating and at the same time removing from the beer heated to a temperature not exceeding 30°, those volatile by-products of fermentation, which, when the beer is pasteurized, alter its taste and smell, by washing the beer with an indifferent gas, then pasteurizing and subsequently cooling the beer, and effecting both operations in a closed vessel and in the presence of an indifferent gas as carbonic-acid gas, for the purpose set forth.

4. In the art of preserving beer, the improvement which consists in deaerating and at the same time removing from the beer those volatile by-products of fermentation, which, when the beer is pasteurized, alter its taste and smell, by maintaining the beer under a partial vacuum and in the presence of an indifferent gas for a sufficient length of time, then pasteurizing and subsequently cooling the beer, and effecting both operations in a closed vessel and in the presence of an indifferent gas, as carbonic-acid gas, for the purpose set forth.

5. In the art of preserving beer, the improvement which consists in deaerating and at the same time removing from the beer those volatile by-products of fermentation which, when the beer is pasteurized, alter its taste and smell, by washing the beer, heated to a temperature not exceeding 30° centigrade, and while being agitated, with an indifferent gas, then pasteurizing and subsequently cooling the beer, effecting both of these operations in a closed vessel and in the presence of an indifferent gas, and finally enlivening the beer by charging it, while being agitated, with carbonic-acid gas, for the purpose set forth.

6. In the art of preserving beer, the improvement which consists in deaerating and at the same time removing from the beer those volatile by-products of fermentation which, when the beer is pasteurized, alter its taste and smell, by maintaining the beer under a partial vacuum for a sufficient length of time, then washing the beer at a temperature above normal but not above 30° centigrade, with an indifferent gas, pasteurizing and subsequently cooling, and finally enlivening the beer by charging it with carbonic-acid gas, and effecting the operations of washing, pasteurizing, cooling and charging under exclusion of atmospheric air, for the purpose set forth.

In testimony that I claim the foregoing as my invention I have signed my name in presence of two subscribing witnesses.

HUGO GRONWALD.

Witnesses:
HY. RYDING,
ALFRED NUTTING.